(12) United States Patent
Behera et al.

(10) Patent No.: US 12,277,031 B2
(45) Date of Patent: Apr. 15, 2025

(54) EFFICIENT TABLE-BASED ARCHIVING OF DATA ITEMS FROM SOURCE STORAGE SYSTEM TO TARGET STORAGE SYSTEM

(71) Applicant: Dell Products L.P., Round Rock, TX (US)

(72) Inventors: Narayan Behera, Pune (IN); Sameer P. Mohod, Pune (IN)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 18/136,395

(22) Filed: Apr. 19, 2023

(65) Prior Publication Data
US 2024/0354196 A1    Oct. 24, 2024

(51) Int. Cl.
G06F 11/14    (2006.01)

(52) U.S. Cl.
CPC ...... *G06F 11/1451* (2013.01); *G06F 11/1435* (2013.01); *G06F 11/1464* (2013.01)

(58) Field of Classification Search
CPC ............. G06F 11/1435; G06F 11/1451; G06F 11/1464
See application file for complete search history.

(56) References Cited

U.S. PATENT DOCUMENTS

| | | | | |
|---|---|---|---|---|
| 6,934,724 B1 * | 8/2005 | Deshayes | ............ | G06F 11/1464 709/248 |
| 7,165,155 B1 | 1/2007 | Duprey et al. | | |
| 7,440,982 B2 | 10/2008 | Lu et al. | | |
| 7,444,464 B2 | 10/2008 | Urmston et al. | | |
| 8,095,726 B1 | 1/2012 | O'Connell et al. | | |
| 8,214,612 B1 | 7/2012 | Natanzon | | |
| 8,301,593 B2 | 10/2012 | Hoffmann et al. | | |

(Continued)

FOREIGN PATENT DOCUMENTS

| | | | |
|---|---|---|---|
| CA | 2668076 A1 * | 5/2008 | |
| WO | 2016111954 A1 | 7/2016 | |

OTHER PUBLICATIONS

Wikipedia's RAID historical version published Mar. 28, 2023 https://en.wikipedia.org/w/index.php?title=RAID&oldid=1146991004 (Year: 2023).*

(Continued)

*Primary Examiner* — Joseph O Schell
(74) *Attorney, Agent, or Firm* — Ryan, Mason & Lewis, LLP

(57) ABSTRACT

An apparatus comprises at least one processing device that includes a processor coupled to a memory. The at least one processing device is configured to maintain for a first storage system one or more index tables characterizing data archived from the first storage system to at least a second storage system, to receive a request to archive a particular data item from the first storage system to the second storage system, to access, responsive to the received request, a corresponding one of the one or more index tables characterizing data archived from the first storage system to at least the second storage system, and to control archiving of the particular data item based at least in part on one or more entries of the corresponding one of the one or more index tables. Archiving of the particular data item is illustratively controlled using content-based identifiers in the corresponding index table.

20 Claims, 7 Drawing Sheets

(56) References Cited

U.S. PATENT DOCUMENTS

| | | |
|---|---|---|
| 8,335,899 B1 | 12/2012 | Meiri et al. |
| 9,104,326 B2 | 8/2015 | Frank et al. |
| 9,208,162 B1 | 12/2015 | Hallak et al. |
| 9,286,003 B1 | 3/2016 | Hallak et al. |
| 9,514,014 B2 | 12/2016 | Webman et al. |
| 9,552,258 B2 | 1/2017 | Hallak et al. |
| 9,606,870 B1 | 3/2017 | Meiri et al. |
| 9,716,754 B2 | 7/2017 | Swift |
| 10,176,046 B1 | 1/2019 | Hu et al. |
| 10,261,693 B1 | 4/2019 | Schneider et al. |
| 10,324,640 B1 | 6/2019 | Chen et al. |
| 10,338,851 B1 | 7/2019 | Kronrod et al. |
| 10,359,965 B1 | 7/2019 | Stronge et al. |
| 10,394,485 B1 | 8/2019 | Chen et al. |
| 10,437,501 B1 | 10/2019 | Kucherov et al. |
| 10,437,855 B1 | 10/2019 | Stronge et al. |
| 10,466,925 B1 | 11/2019 | Blanco et al. |
| 10,496,324 B2 | 12/2019 | Meiri et al. |
| 10,496,489 B1 | 12/2019 | Chen et al. |
| 10,496,672 B2 | 12/2019 | Meiri et al. |
| 10,838,863 B2 | 11/2020 | Kamran et al. |
| 10,866,934 B1 | 12/2020 | Chen et al. |
| 10,884,650 B1 | 1/2021 | Meiri et al. |
| 10,896,200 B1* | 1/2021 | Krishnan ............ H04L 67/1097 |
| 10,929,050 B2 | 2/2021 | Kucherov et al. |
| 10,951,699 B1 | 3/2021 | Sayles et al. |
| 11,079,961 B1 | 8/2021 | Meiri et al. |
| 11,099,767 B2 | 8/2021 | Chen et al. |
| 11,249,834 B2 | 2/2022 | Chen et al. |
| 11,288,286 B2 | 3/2022 | Harduf et al. |
| 11,379,142 B2 | 7/2022 | Shtarkman et al. |
| 11,386,042 B2 | 7/2022 | Porath et al. |
| 2004/0236803 A1* | 11/2004 | Spiegeleer .......... G06F 11/1453 |
| 2007/0022121 A1 | 1/2007 | Bahar et al. |
| 2008/0279462 A1 | 11/2008 | Celi, Jr. |
| 2009/0132955 A1 | 5/2009 | Garg et al. |
| 2009/0276593 A1 | 11/2009 | Jacobson et al. |
| 2009/0319532 A1* | 12/2009 | Akelbein ............... G06F 16/185 |
| 2010/0179941 A1 | 7/2010 | Agrawal et al. |
| 2011/0022566 A1 | 1/2011 | Beaverson et al. |
| 2011/0225123 A1 | 9/2011 | D'Souza et al. |
| 2012/0124282 A1 | 5/2012 | Frank et al. |
| 2012/0159232 A1* | 6/2012 | Shimada ............... G06F 16/183 714/E11.006 |
| 2012/0317353 A1 | 12/2012 | Webman et al. |
| 2013/0305002 A1 | 11/2013 | Hallak et al. |
| 2013/0325824 A1 | 12/2013 | Shoens |
| 2014/0181016 A1 | 6/2014 | Whitehead et al. |
| 2014/0244935 A1 | 8/2014 | Ezra et al. |
| 2015/0046398 A1 | 2/2015 | Camble et al. |
| 2015/0378766 A1 | 12/2015 | Beveridge et al. |
| 2015/0378785 A1 | 12/2015 | Tarasuk-Levin et al. |
| 2016/0150012 A1 | 5/2016 | Barszczak et al. |
| 2016/0170987 A1 | 6/2016 | Kesselman |
| 2016/0202927 A1 | 7/2016 | Klarakis et al. |
| 2016/0224259 A1 | 8/2016 | Ahrens et al. |
| 2016/0261513 A1 | 9/2016 | Aingaran et al. |
| 2016/0345207 A1 | 11/2016 | Kwak et al. |
| 2016/0357468 A1 | 12/2016 | Hathorn et al. |
| 2017/0075842 A1 | 3/2017 | Su et al. |
| 2017/0132243 A1 | 5/2017 | Lewis et al. |
| 2017/0185529 A1 | 6/2017 | Chhabra et al. |
| 2017/0192857 A1 | 7/2017 | Meiri et al. |
| 2018/0095873 A1 | 4/2018 | Nakagoe et al. |
| 2019/0303490 A1 | 10/2019 | Chen et al. |
| 2019/0392060 A1 | 12/2019 | Meiri et al. |
| 2020/0026616 A1 | 1/2020 | Hu et al. |
| 2020/0159627 A1* | 5/2020 | Bedadala ............ H04L 41/0895 |
| 2020/0233881 A1 | 7/2020 | Harduf et al. |
| 2020/0250089 A1 | 8/2020 | Kamran et al. |
| 2020/0341641 A1 | 10/2020 | Kucherov et al. |
| 2020/0364106 A1 | 11/2020 | Chen et al. |
| 2021/0124494 A1 | 4/2021 | Chen et al. |
| 2021/0124657 A1 | 4/2021 | Kamran et al. |
| 2021/0240349 A1 | 8/2021 | Meiri et al. |
| 2021/0357361 A1 | 11/2021 | Porath et al. |
| 2021/0365185 A1 | 11/2021 | Shtarkman et al. |

OTHER PUBLICATIONS

International Search Report and Written Opinion for PCT/US2019/024900, dated Jan. 7, 2020, 12 pages.

International Search Report and Written Opinion for PCT/US2019/024885, dated Jan. 7, 2020, 13 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

EMC Corporation, "Introduction to the EMC XtremIO Storage Array (Ver. 4.0): A Detailed Review," White Paper, Apr. 2015, 65 pages.

EMC Corporation, "Unstoppable Data Reduction: Always-on, In-Line, Zero-Penalty, Enterprise-Class, Free," https://store.emc.com/xtremio, Jul. 2014, 2 pages.

U.S. Appl. No. 18/119,954 filed in the name of Narayan Behera et al. on Mar. 10, 2023, and entitled "Efficient Table-Based Replication Between Source and Target Storage Systems."

* cited by examiner

EFFICIENT TABLE-BASED ARCHIVING OF DATA ITEMS FROM SOURCE STORAGE SYSTEM TO TARGET STORAGE SYSTEM

FIELD

The field relates generally to information processing systems, and more particularly to storage in information processing systems.

BACKGROUND

Many information processing systems are configured to archive data from a first storage system to a second storage system, possibly at different physical sites. These first and second storage systems are illustratively referred to herein as primary and secondary storage systems, or more generally as source and target storage systems.

Conventional approaches to data archiving can be problematic under certain conditions. For example, some conventional approaches can consume excessive amounts of resources of the source and target storage systems as well as associated network resources of one or more networks over which such systems communicate.

SUMMARY

Illustrative embodiments provide techniques for efficient table-based archiving which can advantageously avoid duplicate archiving of files or other types and arrangements of data that are subject to archiving. Such embodiments illustratively involve archiving processes that are carried out between first and second storage arrays or other types of storage systems, also referred to herein as respective source and target storage systems. In some embodiments, the source and target storage systems illustratively comprise respective primary and secondary storage systems, with files of the primary storage system being archived in the secondary storage system, although numerous other arrangements can be used.

The source and target storage systems are illustratively implemented as respective distributed storage arrays comprising respective sets of storage nodes, and may comprise content addressable storage systems, although other types of storage systems can be used in other embodiments. Such source and target storage systems in some embodiments comprise respective source and target clusters.

In an illustrative embodiment, an apparatus comprises at least one processing device that includes a processor coupled to a memory. The at least one processing device is illustratively configured to maintain for a first storage system one or more index tables characterizing data archived from the first storage system to at least a second storage system, to receive a request to archive a particular data item from the first storage system to the second storage system, to access, responsive to the received request, a corresponding one of the one or more index tables characterizing data archived from the first storage system to at least the second storage system, and to control archiving of the particular data item based at least in part on one or more entries of the corresponding one of the one or more index tables.

A given one of the one or more index tables in some embodiments illustratively comprises an archived file index table having a plurality of entries comprising respective content-based identifiers of respective files previously archived between the first storage system and the second storage system.

In some embodiments, the content-based identifiers in respective entries of the archived file index table illustratively comprise respective checksums generated from content of the respective previously-archived files and/or respective hash values generated from content of the respective previously-archived files. Other types of content-based identifiers can be used in other embodiments.

In some embodiments, at least one of the one or more index tables more particularly characterizes a plurality of data files previously archived from the first storage system to the second storage system.

By way of example, the first storage system illustratively comprises a primary storage system and the second storage system illustratively comprises a secondary storage system, although as indicated previously numerous other arrangements of multiple storage systems are possible in other embodiments.

In some embodiments, the first storage system comprises a source storage system of a designated archiving process and the second storage system comprises a target storage system of the designated archiving process. In such an embodiment, in conjunction with completion of a corresponding portion of the designated archiving process for a given data file, the source storage system creates a stub file to replace the given data file, releases storage space occupied by the given data file, and marks archiving of the given data file as complete.

Additionally or alternatively, controlling archiving of the particular data item based at least in part on one or more entries of the corresponding one of the one or more index tables illustratively comprises initiating archiving of the particular data item from the first storage system to the second storage system responsive to the particular data item not having a corresponding content-based identifier in a first index table of the first storage system.

In some embodiments, controlling archiving of the particular data item based at least in part on one or more entries of the corresponding one of the one or more index tables further comprises completing archiving of the particular data item from the first storage system to the second storage system responsive to the particular data item not having a corresponding content-based identifier in a second index table of the second storage system.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
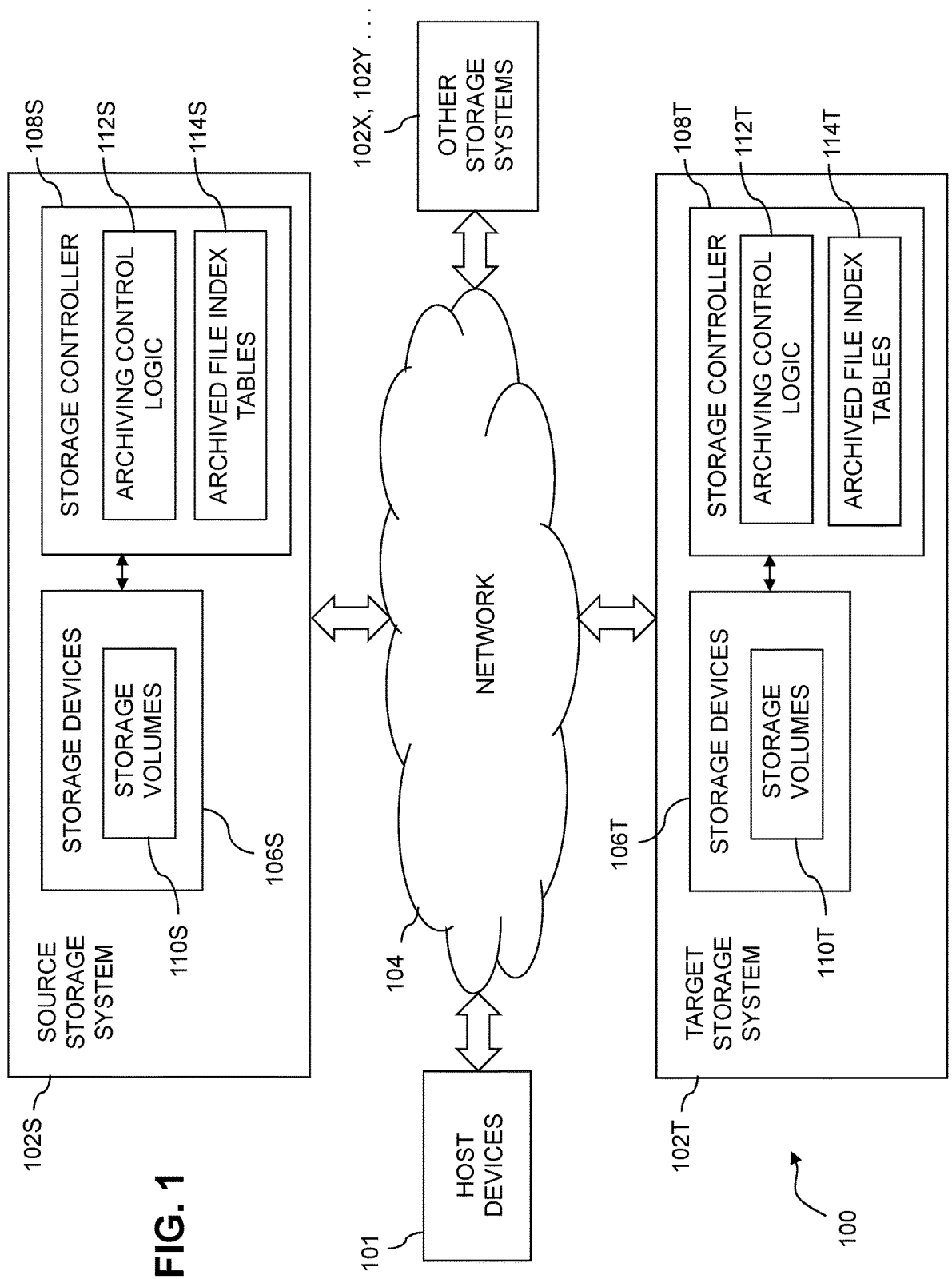
FIG. 1 is a block diagram of an information processing system configured with functionality for efficient table-based archiving between source and target storage systems in an illustrative embodiment.

FIG. 1 shows an information processing system 100 configured in accordance with an illustrative embodiment. The information processing system 100 comprises a plurality of host devices 101, a source storage system 102S, a target storage system 102T, and a plurality of other storage systems respectively denoted 102X, 102Y, and so on, all of which are configured to communicate with one another over a network 104. Different pairs of the storage systems 102 are illustratively configured to participate in at least one archiving process with one another, such as an archiving process in which files or other types and arrangements of data are archived from the source storage system 102S operating as a primary storage system to the target storage system 102T operating as a secondary storage system, possibly with involvement of at least one of the host devices 101. Additionally or alternatively, the source storage system 102S can serve as a target storage system of another archiving process in which the target storage system 102T serves as a source storage system.

Accordingly, it is to be appreciated that each of the storage systems 102 can be configured to operate as both a source storage system for one or more archiving processes, and as a target storage system for one or more other archiving processes, relative to one or more other ones of the storage systems 102. Terms used herein such as "archiving between" first and second storage systems are intended to be broadly construed, so as to encompass, for example, arrangements in which a given file or other data item from source storage system 102S is archived in target storage system 102T, and then subsequently replaced with a stub file in the source storage system 102S in order to free up the storage space previously occupied by the given file or other data item in the source storage system 102S. The term "stub file" as used herein is intended to be broadly construed, and may comprise, for example, a link to the given file or other data item as archived in the target storage system 102T. Again, these roles of the storage systems 102 can be reversed in other embodiments.

The storage systems 102 can comprise, for example, respective storage arrays, storage clusters, or other types of storage systems, in any combination.

The source storage system 102S comprises a plurality of storage devices 106S and an associated storage controller 108S. The storage devices 106S store storage volumes 110S. The storage volumes 110S illustratively comprise respective logical units (LUNs) or other types of logical storage volumes.

Similarly, the target storage system 102T comprises a plurality of storage devices 106T and an associated storage controller 108T. The storage devices 106T store storage volumes 110T, at least a portion of which represent respective LUNs or other types of logical storage volumes that include files or other data items that are archived from the source storage system 102S to the target storage system 102T in accordance with a given archiving process.

Each of the other storage systems such as 102X and 102Y is assumed to be configured to include storage devices and a storage controller, in a manner similar to that illustrated for source and target storage systems 102S and 102T in the figure.

Each of the storage systems 102 is illustratively associated with a corresponding set of one or more of the host devices 101.

The host devices 101 illustratively comprise respective computers, servers or other types of processing devices capable of communicating with the storage systems 102 over the network 104. For example, at least a subset of the host devices 101 may be implemented as respective virtual machines of a compute services platform or other type of processing platform. The host devices 101 in such an arrangement illustratively provide compute services such as execution of one or more applications on behalf of each of one or more users associated with respective ones of the host devices 101. Such applications illustratively generate input-output (IO) operations that are processed by a corresponding one of the storage systems 102. The term "input-output" as used herein refers to at least one of input and output. For example, IO operations may comprise write requests and/or read requests directed to logical addresses of a particular logical storage volume of a given one of the storage systems 102. These and other types of IO operations are also generally referred to herein as IO requests.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage systems 102 implement LUNs or other logical storage volumes configured to store data for users associated with the host devices 101. Such data in some embodiments herein illustratively comprises a plurality of files, which can each comprise, for example, one or more pages, blocks or other types of objects, such as at least a portion of a LUN or other logical storage volume, and the term "file" as used herein is therefore intended to be broadly construed. A file may be viewed as an example of what is still more generally referred to herein as a "data item." A given "data item" as that term is broadly used herein may alternatively comprise multiple files, or a portion of a file.

The host devices 101 interact with the storage systems 102 utilizing read and write commands as well as other types of commands that are transmitted over the network 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Examples of IO operations configured in accordance with NVMe command features and functionality are described in the NVMe Base Specification, Revision 2.0b, Jan. 6, 2022, which is incorporated by reference herein. Other NVMe storage access protocols of this type that may be utilized in illustrative embodiments disclosed herein include NVMe/FC, NVMeoF and NVMe/TCP.

Also, the term "storage device" as used herein is intended to be broadly construed, so as to encompass, for example, a logical storage device such as a LUN or other logical storage volume. A logical storage device can be defined in the storage systems 102 to include different portions of one or more physical storage devices. Storage devices 106 may therefore be viewed as comprising respective LUNs or other logical storage volumes.

The storage controller 108S of source storage system 102S in the FIG. 1 embodiment includes archiving control logic 112S and archived file index tables 114S. It can also include additional elements, such as a checksum generator, a hash value generator or another mechanism for generating content-based identifiers for respective data files.

Similarly, the storage controller 108T of target storage system 102T includes archiving control logic 112T and archived file index tables 114T. The storage controller 108T, like the storage controller 108S, can also include additional elements, such as a checksum generator, a hash value generator or another mechanism for generating content-based identifiers for respective data files.

The instances of archiving control logic 112S and 112T are collectively referred to herein as archiving control logic 112. Such archiving control logic instances are also referred to herein as individually or collectively comprising at least a portion of a "archive engine" of the system 100. The archived file index tables 114S and 114T are collectively referred to herein as archived file index tables 114.

The archiving control logic 112 of the storage systems 102 controls performance of one or more archiving processes carried out between those storage systems, which as noted above in some embodiments further involves at least one of the host devices 101. For example, in some embodiments, the data archived from the source storage system 102S to the target storage system 102T in accordance with a given archiving process controlled by the archiving control logic 112 can include all of the data stored in the source storage system 102S, or only certain designated subsets of the data stored in the source storage system 102S, such as particular designated files or other data items within one or more LUNs or other logical storage volumes of the storage volumes 110S. Different archiving processes of different types can be implemented for different parts of the stored data.

A given file or other data item designated for archiving from the source storage system 102S to the target storage system 102T therefore illustratively comprises at least one file or other designated data of a set of one or more LUNs or other instances of the storage volumes 110S of the source storage system 102S. Each such logical storage volume illustratively comprises at least a portion of a physical storage space of one or more of the storage devices 106S. Similarly, each of the LUNs or other instances of the storage volumes 110T of the target storage system 102T illustratively comprises at least a portion of a physical storage space of one or more of the storage devices 106T.

The archiving control logic 112 of the storage systems 102 is illustratively configured to control the performance of an efficient table-based archiving process utilizing the archived file index tables 114. Examples of such processes will be described in more detail below in conjunction with the flow diagrams of FIGS. 2 through 5.

The storage controllers 108 of the storage systems 102 should also be understood to include additional modules and other components typically found in conventional implementations of storage controllers and storage systems, although such additional modules and other components are omitted from the figure for clarity and simplicity of illustration. For example, in some embodiments, each of the storage controllers 108 has one or more local caches or allocated portions of a global cache associated therewith, although numerous alternative arrangements are possible. The storage controllers 108 can be implemented as respective storage processors, directors or other storage system components configured to control storage system operations relating to processing of IO operations.

It will be assumed for the following description of the FIG. 1 embodiment that there is a table-based archiving process carried out between the source storage system 102S and the target storage system 102T in the system 100, utilizing their respective instances of archiving control logic 112S and 112T and their respective archived file index tables 114S and 114T.

For example, the archiving process can comprise an archiving process in which files of the source storage system 102S operating as a primary storage system are archived in the target storage system 102T operating as a secondary storage system. Other types of archiving arrangements can be used in other embodiments.

Additional details of example table-based archiving processes of illustrative embodiments will be provided elsewhere herein.

It should be noted that each of the host devices 101 illustratively has multiple paths to at least one of the storage systems 102, with at least one of the storage devices 106 of such a storage system being visible to that host device on a given one of the paths. A given one of the storage devices 106 may be accessible to the given host device over multiple paths.

The host devices 101, storage systems 102 and network 104 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 101 and the storage systems 102 may be implemented on respective distinct processing platforms, although numerous other arrangements are possible. For example, in some embodiments at least portions of the host devices 101 and the storage systems 102 are implemented on the same processing platform. A given one of the storage systems 102 can therefore be implemented at least in part within at least one processing platform that implements at least a subset of the host devices 101.

The network 104 in some embodiments may be implemented using multiple networks of different types to interconnect host device and storage system components of the system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 101 may comprise respective sets of IO queues and respective multi-path input-output (MPIO) drivers, with the MPIO drivers collectively comprising a multi-path layer of the host devices 101. Path selection functionality for delivery of IO operations from the host devices 101 to the storage systems 102 is illustratively provided in the multi-path layer by respective instances of path selection logic implemented within the MPIO drivers. The MPIO drivers may comprise, for example, otherwise conventional MPIO drivers, such as PowerPath® drivers from Dell Technologies. Other types of MPIO drivers from other driver vendors may be used in other embodiments.

The host devices 101 can include additional or alternative components. For example, in some embodiments, the host devices 101 comprise respective local caches, implemented using respective memories of those host devices. A given such local cache can be implemented using one or more cache cards. A wide variety of different caching techniques can be used in these and other embodiments, as will be appreciated by those skilled in the art. Other examples of memories of the respective host devices 101 that may be utilized to provide local caches include one or more memory cards or other memory devices, such as, for example, an NVMe over PCIe cache card, a local flash drive or other type of NVM storage drive, or combinations of these and other host memory devices.

An MPIO driver of a given one of the host devices 101 is illustratively configured to deliver IO operations selected from its corresponding set of IO queues to one or more of the storage systems 102 via selected ones of multiple paths over the network 104. The sources of the IO operations stored in the set of IO queues illustratively include respective processes of one or more applications executing on the given host device. For example, IO operations can be generated by each of multiple processes of a database application running on the given host device. Such processes issue IO operations for delivery to one or more of the storage systems 102 over the network 104. Other types of sources of IO operations may be present in a given implementation of system 100.

A given IO operation is therefore illustratively generated by a process of an application running on the given host device, and is queued in a given one of the IO queues of that host device with other operations generated by other processes of that application, and possibly other processes of other applications.

The paths from the given host device to one or more of the storage systems 102 illustratively comprise paths associated with respective initiator-target pairs, with each initiator comprising a host bus adaptor (HBA) or other initiating entity of the host device and each target comprising a port or other targeted entity corresponding to one or more of the storage devices 106 of the storage system. As noted above, the storage devices 106 illustratively comprise LUNs or other types of logical storage devices.

In some embodiments, the paths are associated with respective communication links between the host device and the storage system with each such communication link having a negotiated link speed. For example, in conjunction with registration of a given HBA to a switch of the network 104, the HBA and the switch may negotiate a link speed. The actual link speed that can be achieved in practice in some cases is less than the negotiated link speed, which is a theoretical maximum value. The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the network 104 in order to determine the negotiated rate.

As noted above, the initiators of the initiator-target pairs illustratively comprise respective HBAs of the given host device and the targets of the initiator-target pairs comprise respective storage array ports of one or more of the storage systems 102.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple WWNs or WWIDs to the network 104 and the storage systems 102. A WWN or WWID is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given host device with a need to distinguish which IO is related to which producer.

References herein to the term "initiators" are intended to be broadly construed, and should therefore be understood to encompass physical initiators, virtual initiators, or combinations of both physical and virtual initiators.

As is apparent from the foregoing, the host devices 101 in some embodiments communicate with the storage systems 102 by sending IO operations to the storage systems 102 using one or more storage access protocols such as SCSI, Internet SCSI (iSCSI), SCSI over FC (SCSI-FC), NVMe over FC (NVMe/FC), NVMe over Fabrics (NVMeoF), NVMe over TCP (NVMe/TCP), and/or others.

Various scheduling algorithms, load balancing algorithms and/or other types of algorithms can be utilized by the MPIO driver of the given host device in delivering IO operations from the IO queues to one or more of the storage systems 102 over particular paths via the network 104. Each such IO operation is assumed to comprise one or more commands for instructing the storage system to perform particular types of storage-related functions such as reading data from or writing data to particular logical volumes of the storage system. Such commands are assumed to have various payload sizes associated therewith, and the payload associated with a given command is referred to herein as its "command payload."

A command directed by the given host device to the storage system is considered an "outstanding" command until such time as its execution is completed in the viewpoint of the host device, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Selecting a particular one of multiple available paths for delivery of a selected one of the IO operations of the set of IO queues of the given host device is more generally referred to herein as "path selection." Path selection as that term is broadly used herein can in some cases involve both selection of a particular IO operation and selection of one of multiple possible paths for accessing a corresponding logical device of one of the storage systems 102. The corresponding logical device illustratively comprises a LUN or other logical storage volume to which the particular IO operation is directed.

It should be noted that paths may be added or deleted between the host devices 101 and the storage systems 102. For example, the addition of one or more new paths from a given host device to one of the storage systems 102 or the deletion of one or more existing paths from the given host device to one of the storage systems 102 may result from respective addition or deletion of at least a portion of the storage devices 106 of that storage system.

Addition or deletion of paths can also occur as a result of zoning and masking changes or other types of storage system reconfigurations performed by a storage administrator or other user. Some embodiments are configured to send a predetermined command from the given host device to the storage system, illustratively utilizing the MPIO driver of the host device, to determine if zoning and masking information has been changed. The predetermined command can comprise, for example, a log sense command, a mode sense command, a "vendor unique" or VU command, or combinations of multiple instances of these or other commands, in an otherwise standardized command format.

In some embodiments, paths are added or deleted in conjunction with addition of a new storage system or deletion of an existing storage system from the system 100. In these and other situations, path discovery scans may be repeated as needed in order to discover the addition of new paths or the deletion of existing paths. A given path discovery scan can be performed utilizing known functionality of conventional MPIO drivers, such as PowerPath® drivers. The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage systems 102 as well to discover the disappearance of any existing LUNs that have been deleted from the storage systems 102.

For each of one or more new paths identified in the path discovery scan, the given host device may be configured to execute a host registration operation for that path. The host registration operation for a given new path illustratively provides notification to the storage system that the host device has discovered the new path.

One or more of the storage systems 102 may each comprise a persistent memory that is implemented using a flash memory or other type of non-volatile memory of the storage system. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage system, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage systems 102 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage system in its persistent memory. The response time control module is assumed to operate in conjunction with the above-noted IO operation priority queues.

A given storage system illustratively utilizes its IO operation priority queues to provide different levels of performance for IO operations. For example, the IO operation priority queues may have respective different priority levels. The storage system may be configured to provide different priority levels for different ones of the IO operations by assigning different ones of the IO operations to different ones of the IO operation priority queues. The IO operation priority queues are illustratively associated with respective SLOs for processing of IO operations in the storage system. Process tags may be used in assigning different ones of the IO operations to different ones of the IO operation priority queues.

As mentioned above, communications between the host devices 101 and the storage systems 102 may utilize PCIe connections or other types of connections implemented over one or more networks, using interfaces and protocols as previously described. Numerous other interfaces and associated protocols can be used in other embodiments.

One or more of the storage systems 102 in some embodiments may be implemented as part of cloud infrastructure in the form of a cloud-based system. Such a cloud-based system can additionally or alternatively be used to implement other portions of system 100, such as one or more of the host devices 101.

The storage devices 106 of the storage systems 102 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

A given one of the storage systems 102 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, one or more of the storage systems 102 may be implemented as respective cluster storage systems each comprising a plurality of storage nodes interconnected by one or more networks.

It should therefore be apparent that the term "storage system" as used herein is intended to be broadly construed, and may encompass multiple distinct instances of a commercially-available storage array. For example, a given one of the storage systems 102 may comprise one or more PowerStore™ and/or PowerMax™ storage arrays, commercially available from Dell Technologies. Numerous other types of storage arrays can be used in implementing storage systems 102 in other embodiments.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, the storage systems 102 comprise first and second storage arrays arranged as respective primary and secondary storage systems, with the secondary storage system being configured to archive files or other types and arrangements of data of the primary storage system.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 101 and storage systems 102 are possible, in which certain ones of the host devices 101 and storage systems 102 reside in one data center in a first geographic location while other ones of the host devices 101 and storage systems 102 reside in one or more other data centers in one or more other geographic locations that are potentially remote from the first geographic location. Thus, it is possible in some implementations of the system 100 for different ones of the host devices 101 and storage systems 102 to reside in different data centers. Numerous other distributed implementations of the host devices 101 and/or the storage systems 102 are possible.

It is to be appreciated that these and other features of illustrative embodiments are presented by way of example only, and should not be construed as limiting in any way. Accordingly, different numbers, types and arrangements of system components such as host devices 101, network 104, and storage systems 102, including their corresponding instances of archiving control logic 112 and archived file index tables 114, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

As indicated previously, illustrative embodiments overcome various drawbacks of conventional practice by configuring the system 100 to include functionality for efficient table-based archiving, as will now be described in more detail.

These embodiments advantageously avoid duplicate archiving of files or other types and arrangements of data that are subject to archiving in system 100. Such embodiments illustratively involve archiving processes that are carried out between first and second ones of the storage systems 102, also referred to as respective source and target storage systems of a given archiving process. Again, a given one of the storage systems 102 can serve as a source storage system in one archiving process and as a target storage system in another archiving process.

As will become more apparent, these and other embodiments disclosed herein advantageously reduce resource consumption of the source and target storage systems as well as associated network resources of the network 104 over which the source and target storage systems communicate.

In accordance with example table-based archiving functionality implemented in system 100, the storage controller 108S of source storage system 102S maintains archived file index tables 114S characterizing data archived between the source storage system 102S and the target storage system 102T and possibly one or more other storage systems 102, such as storage system 102X and/or storage system 102Y. Similarly, the storage controller 108T of target storage system 102T maintains archived file index tables 114T characterizing data archived between the target storage system 102T and one or more additional storage systems, illustratively including one or more of the source storage system 102S and the other storage systems 102, such as storage system 102X and/or storage system 102Y. Each of the other storage systems 102 is assumed to be similarly configured.

The storage controllers 108 may be viewed as illustrative examples of what are more generally referred to herein as "at least one processing device" of the system 100. Each such processing device comprises at least one processor coupled to a memory. Additionally or alternatively, each of the host devices 101 and the storage systems 102 may similarly be viewed as an example of an apparatus comprising at least one processing device as that term is broadly used herein.

In some embodiments, in conjunction with performance of a given archiving process, the source storage system 102S receives a request to archive a particular data item from the source storage system 102S to the target storage system 102T. The source storage system 102S accesses, responsive to the received request, a corresponding one of the archived file index tables, such as one of the archived file index tables 114S, maintained by the source storage system 102S and characterizing data archived between the source storage system 102S and the target storage system 102T, and controls archiving of the particular data item based at least in part on one or more entries of the corresponding one of the archived file index tables.

The archived file index tables 114S and 114T are examples of what are more generally referred to herein as "index tables." A given one of the archived file index file tables, such as one of the archived file index tables 114S, includes a plurality of entries comprising respective content-based identifiers of respective files previously archived between at least two of the storage systems 102. It should be noted in this regard that the term "file" as used herein is intended to be broadly construed, so as to encompass, for example, pages or other blocks of data that are archived between two or more storage systems as part of an archiving process. A file is still more generally referred to herein as a "data item." Index tables can therefore be used to index content-based identifiers for other types of data items, and should not be viewed as being limited to files.

The content-based identifiers in respective entries of the archived file index table in some embodiments comprise respective checksums generated from content of the respective previously-archived files. A more particular example of such a checksum is a CRC-32 checksum, where CRC denotes cyclic redundancy check, although other types of checksums can be used in other embodiments.

Additionally or alternatively, the content-based identifiers in respective entries of the archived file index table may comprise respective hash values generated from content of the respective previously-archived files, such as hash values generated by applying a secure hashing algorithm (SHA) such as SHA256 or SHA512 to the content of the respective previously-archived files. Again, other types of hash values or other content-based identifiers can be used in other embodiments, including combinations of various types of checksums, hash values or other content-based identifiers.

Accordingly, for a given archived file index table, the table illustratively has a plurality of entries comprising at least respective content-based identifiers of respective files that have been previously archived between at least two of the storage systems 102, such as from the source storage system 102S to the target storage system 102T, or from one of the other storage systems 102 to the target storage system 102T. The term "table" as used herein is intended to be broadly construed so as to encompass, for example, any of a wide variety of different arrangements of one or more data structures suitable for storing checksums, hash values or other content-based identifiers of one or more previously-archived files.

In some embodiments, at least one of a plurality of index tables therefore characterizes data files previously archived between two or more of the storage systems 102. Different instances of the index tables can characterize data previously archived between different pairs of the storage systems 102.

In conjunction with completion of a corresponding portion of a designated archiving process for a given data file, the source storage system 102S illustratively creates a stub file to replace the given data file, releases storage space occupied by the given data file, and marks archiving of the given data file as complete. The stub file can comprise, for example, a link to the given data file as archived in the target storage system 102T.

Additionally or alternatively, in some embodiments, controlling archiving of the particular data item based at least in part on one or more entries of the corresponding one of the one or more index tables illustratively comprises initiating archiving of the particular data item from the source storage system 102S to the target storage system 102T responsive to the particular data item not having a corresponding content-based identifier in a first index table of the archived file index tables 114S of the source storage system 102S.

Controlling archiving of the particular data item based at least in part on one or more entries of the corresponding one of the one or more index tables further illustratively comprises completing archiving of the particular data item from the source storage system 102S to the target storage system 102T responsive to the particular data item not having a corresponding content-based identifier in a second index table of the archived file index tables 114T of the target storage system 102T.

Additional illustrative embodiments will now be described in more detail with reference to an example information processing system comprising one or more host devices and multiple storage systems. The information processing system may be viewed as an example of system 100 that includes host devices 101 and storage systems 102 as previously described in conjunction with the FIG. 1 embodiment.

It is assumed in the embodiments to be described that the storage systems are implemented as respective storage clusters with each such storage cluster comprising a plurality of storage nodes. A given such storage system may be viewed as comprising at least one storage array, although numerous other storage system arrangements can be utilized in other embodiments. The source and target storage systems are referred to in some description below as respective source and target clusters.

As indicated previously, illustrative embodiments provide improved archiving efficiency relative to conventional approaches. For example, some conventional approaches archive data from a source cluster to a target cluster in accordance with a predetermined archiving schedule which does not consider file availability on the target cluster.

Illustrative embodiments disclosed herein can advantageously determine upfront for a given file whether or not that file has already been archived from a given source cluster of a current archiving process, or possibly some other source cluster of a different archiving process, to the target cluster, and avoid archiving that same file again from the given source cluster to the target cluster.

Determining the appropriate files for a given archiving job (e.g., just those files that have not yet been archived to the target cluster) using the disclosed techniques can save significant amounts of system resources and network bandwidth that would otherwise have been consumed by performing duplicate archiving for one or more files.

Consider by way of example a given file archived from the source cluster to the target cluster in accordance with a given archiving job. On a subsequent iteration of the given archiving job, or a different archiving job implementing a different archiving policy, possibly involving a different source cluster, the same file will again be archived even though it is already available on the target cluster due to the given archiving job. As indicated above, archiving the same file again to the same target cluster can consume excessive system resources and network bandwidth, leading to adverse performance impacts.

Illustrative embodiments provide archiving algorithms that facilitate selection of appropriate files for archiving from a source cluster to a target cluster, so as to avoid excessive consumption of system resources and network bandwidth, and the associated negative performance impacts. Such embodiments provide better archiving performance at least in part by implementing a mechanism to identify files that have already been archived to that target cluster or are otherwise available on the target cluster before archiving those files. Accordingly, in some embodiments, only those files that have not yet been archived to the target cluster or are otherwise not available in the target cluster are archived from the source cluster to the target cluster as part of a given archiving job.

Illustrative embodiments herein can overcome the above-noted drawbacks of conventional arrangements by providing techniques that improve archiving efficiency at least in part by ignoring duplicate files in archiving.

These techniques include algorithms that are implemented at least in part by archiving control logic of respective storage controllers of respective multiple storage systems, utilizing archived file index tables maintained by those storage systems.

An example algorithm implementing such techniques illustratively includes the following steps, although it is to be appreciated that additional or alternative steps can be used in other embodiments:

1. Compute checksums and/or hashes ("checksum/hashes") for each of a plurality of files to be archived from a source cluster to a target cluster as part of a current archiving job. Although files are used by way of illustrative example in this embodiment, other embodiments can use other types and arrangements of data, such as data blocks, data pages, etc. A checksum/hash of a given file can comprise a checksum of that file, a hash of that file, and/or other content-based identifying information determined at least in part as a function of at least one of the checksum of the file and the hash of the file. Any of a wide variety of different checksum generating techniques and/or secure hashing algorithms or other hashing algorithms can be used in illustrative embodiments herein.

2. Scan the computed checksum/hashes against a target cluster index table maintained on the source cluster. For example, the source cluster illustratively maintains the target cluster index table for all files that it has previously archived to the target cluster. The target cluster index table is scanned by the source cluster in order to determine if any of the files that are proposed for archiving from the source cluster to the target cluster have already been archived by the source cluster to the target cluster. Those files will have respective checksum/hashes that are already in the target cluster index table maintained on the source cluster for the target cluster. The source cluster can maintain different target cluster index tables for each of a plurality of different target clusters to which it archives files or other types and arrangements of data. The target cluster also illustratively maintains its own version of a target cluster index table for files that are successfully archived to that target cluster, from the source cluster of the current archiving job as well as from other source clusters.

3. For any file proposed for archiving that already has its checksum/hash in the target cluster index table maintained by the source cluster, the source cluster creates a stub file matching the checksum/hash, replaces that file with the stub file, reclaims the corresponding source cluster storage space, and marks the archiving of that file as complete. Different orderings of such operations can be used here and elsewhere. For example, the reclaiming of the corresponding storage cluster storage space can be done after marking the archiving of the file as complete. Other variations can be made, as will be apparent to those skilled in the art.

4. Initiate archiving as part of the current archiving job only for those files that do not have corresponding matching entries in the target cluster index table maintained on the source cluster. For example, for a given file proposed for archiving from the source cluster to the target cluster as part of the current archiving job, the archiving of the given file does not commence until after it has been determined that the given file does not have a corresponding matching entry in the target cluster index table maintained on the source cluster. Such archiving of the given file illustratively includes archiving of the file metadata and its checksum/hash. Accordingly, the source cluster does not start the archiving of any file that it has already archived to the target cluster. The archiving of a given such file can commence by first sending an archiving request including the checksum/hash of that file to the target cluster.

5. Update the target cluster index table maintained on the source cluster for a given file after the archiving of that file completes successfully on the target cluster.

6. On the target cluster, for a given file proposed for archiving from the source cluster, based on the above-described determination that the source cluster has not previously archived the given file to the target cluster, a determination is made as to whether or not the given file was previously archived to the target cluster from some other source cluster or is otherwise available in the target cluster. This determination illustratively involves scanning a target cluster index table maintained on the target cluster. Such a target cluster index table illustratively includes checksum/hashes for respective files available on the target cluster. If the scan indicates that the given file proposed for archiving is already available on the target cluster, due to previous archiving from another source cluster or otherwise, that file is not archived as part of the current archiving job.

7. Archive only those of the files proposed for archiving from the source cluster to the target cluster that do not have matching entries in the target cluster index table maintained by the target cluster. Accordingly, the only files of the current archiving job that are actually archived from the source cluster to the target cluster are those files that have not been previously archived from the source cluster to the target cluster, but only to the extent those files have not been previously archived from any other source cluster to the target cluster or are otherwise already available in the target cluster.

8. For each of the files proposed for archiving that were identified as being already available in the target cluster, as well as for any files that were not already available and therefore are actually archived to the target cluster, the target cluster sends a corresponding notification to the source cluster. The source cluster creates a stub file matching the checksum/hash, replaces that file with the stub file, reclaims the corresponding source cluster storage space, and marks the archiving of that file as complete. Again, different orderings of such operations can be used here and elsewhere.

This particular algorithm is presented by way of illustrative example only, and other embodiments can use other types of algorithms having different arrangements of additional or alternative steps to provide the disclosed functionality for efficient table-based archiving. Also, the ordering of the steps can be varied, and one or more of the steps can be performed at least in part in parallel with other ones of the steps.

Advantageously, the above-described example algorithm and other illustrative embodiments disclosed herein can significantly reduce the system resources and network bandwidth consumed by a given archiving process, thereby providing substantially more efficient archiving and avoiding adverse performance impacts of conventional approaches.

Additional examples of algorithms utilized in efficient table-based archiving arrangements will be described below in conjunction with the flow diagrams of FIGS. 2 through 5. Each such algorithm can be implemented at least in part by archiving control logic in a storage controller of a corresponding one of the storage systems.

Figure 2:
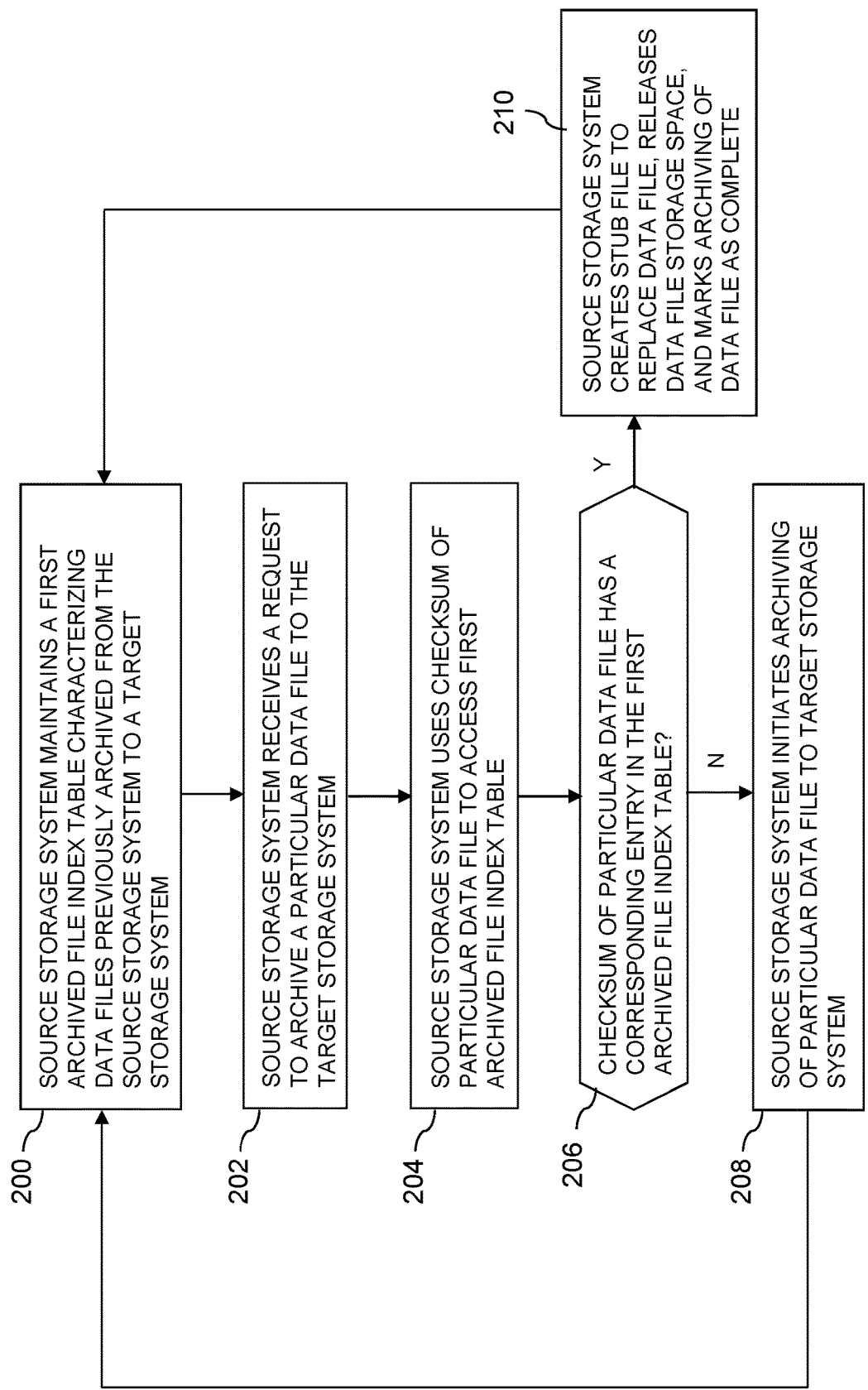
FIG. 2 is a flow diagram of an example source-side portion of an efficient table-based archiving process in an illustrative embodiment.
Figure 3:
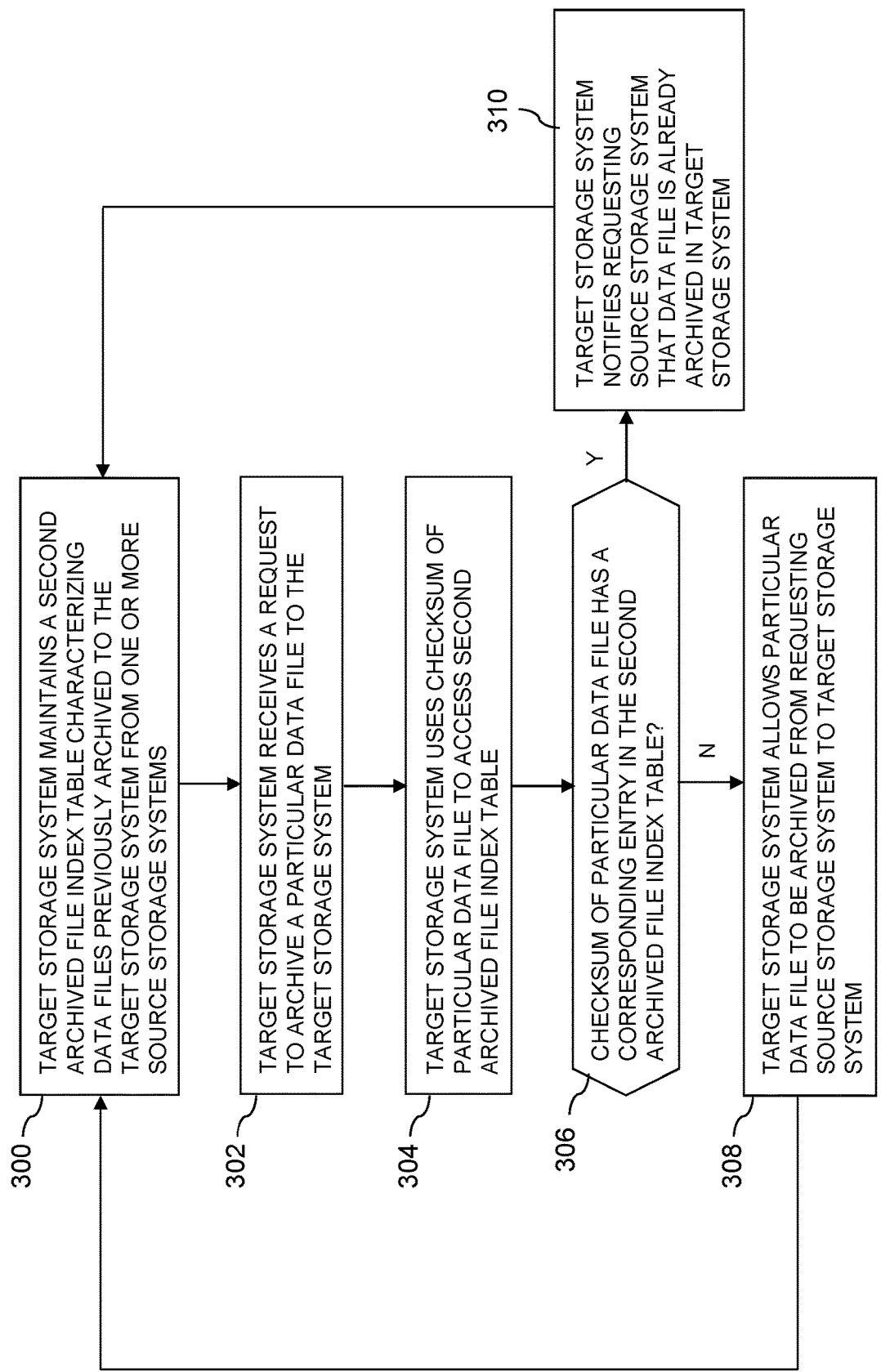
FIG. 3 is a flow diagram of an example target-side portion of an efficient table-based archiving process in an illustrative embodiment.

FIGS. 2 and 3 show respective source-side and target-side portions of an efficient table-based archiving process in an illustrative embodiment. These source-side and target-side portions of the efficient table-based archiving process can be performed, for example, by respective ones of the source storage system 102S and target storage system 102T, utilizing their respective storage controllers 108 and associated instances of archiving control logic 112 and archived file index tables 114.

Referring initially to FIG. 2, the source-side portion of the example process includes steps 200 through 210 as shown.

In step 200, a source storage system maintains a first archived file index table characterizing data files previously archived from the source storage system to a target storage system. It is assumed in this embodiment that the first archived file index table stores content-based identifiers of respective data files that were previously archived from the source storage system to the target storage system, with the content-based identifiers in this embodiment more particularly comprising respective checksums of the previously-archived data files, such as CRC-32 or other checksums computed from content of the respective data files, although it is to be appreciated that other types of content-based identifiers and table formats can be used in other embodiments.

In step 202, the source storage system receives a request to archive a particular data file in the target storage system, illustratively in conjunction with an ongoing archiving process, such as an archiving process in which files of the source storage system operating as a primary storage system are archived in the target storage system operating as a secondary storage system. The request can be received, for example, from an associated host device in the case of an archiving process controlled at least in part by the host device, and/or from archiving control logic of the source storage system in the case of an archiving process controlled at least in part by the source storage system.

In step 204, the source storage system uses a checksum of the particular data file to access the first archived file index table. The checksum can be computed "on the fly" by the source storage system, or retrieved from memory or other storage, illustratively under the control of the archiving control logic of the source storage system.

In step 206, a determination is made as to whether or not the checksum of the particular data file has a corresponding entry in the first archived file index table. Responsive to the checksum of the particular data file not having an entry in the first archived file index table, the process moves to step 208, and otherwise moves to step 210 as indicated.

In step 208, which is reached if the checksum of the particular data file does not have an entry in the first archived file index table, the source storage system initiates archiving of the particular data file to the target storage system. In conjunction with the archiving of the particular data file to the target storage system, the process returns to step 200 to update the first archived file index table to include an entry for the particular data file, once the archiving thereof is complete. Such updating is illustratively performed responsive to receipt in the source storage system of a notification from the target storage system that the archiving of the particular file is complete in the target storage system.

In step 210, which is reached if the checksum of the particular data file has an entry in the first archived file index table, the source storage system creates a stub file to replace the data file, releases the storage space occupied by the data file, and marks the archiving of the data file as complete. Accordingly, the source storage system does not initiate archiving of the particular data file to the target storage system, thereby avoiding a duplicative archiving of that data file. The process then returns to step 200 as indicated.

Referring now to FIG. 3, the target-side portion of the example process includes steps 300 through 310 as shown.

In step 300, a target storage system maintains a second archived file index table characterizing data files previously archived from one or more source storage systems to the target storage system. The one or more source storage systems may comprise, for example, a different source storage system, that is, different than the source storage system that performs the source-side portion of FIG. 2. Like the FIG. 2 embodiment, it is assumed in this embodiment that the second archived file index table stores content-based identifiers of respective data files that were previously archived from the one or more source storage systems to the target storage system, with the content-based identifiers in this embodiment more particularly comprising respective checksums of the previously-archived data files, such as CRC-32 or other checksums computed from content of the respective data files. Again, other types of content-based identifiers and table formats can be used in other embodiments.

In step 302, the target storage system receives a request to archive a particular data file in the target storage system, illustratively in conjunction with an ongoing archiving process, such as an archiving process in which files of the source storage system operating as a primary storage system are archived in the target storage system operating as a secondary storage system. The request can be received, for example, from an associated host device in the case of an archiving process controlled at least in part by the host device, and/or from archiving control logic of the source storage system in the case of an archiving process controlled at least in part by the source storage system.

In step 304, the target storage system uses a checksum of the particular data file to access the second archived file index table. The checksum can be computed "on the fly" by the target storage system, or retrieved from memory or other storage, illustratively under the control of the archiving control logic of the target storage system. Additionally or alternatively, the checksum can be received with the request received in step 302.

In step 306, a determination is made as to whether or not the checksum of the particular data file has a corresponding entry in the second archived file index table. Responsive to the checksum of the particular data file not having an entry in the second archived file index table, the process moves to step 308, and otherwise moves to step 310 as indicated.

In step 308, which is reached if the checksum of the particular data file does not have an entry in the second archived file index table, the target storage system allows the particular data file to be archived from the requesting source storage system to the target storage system. In conjunction with the archiving of the particular data file in the target storage system, the process returns to step 300 to update the second archived file index table to include an entry for the particular data file, once the archiving thereof is complete in the target storage system. The target storage system illustratively sends a notification to the requesting source storage system once the archiving of the data file is complete in the target storage system.

In step 310, which is reached if the checksum of the particular data file has an entry in the second archived file index table, the target storage system notifies the requesting source storage system that the particular data file is already archived in the target storage system. Accordingly, the target storage system does not allow the particular data file to be archived to the target storage system, thereby avoiding a duplicative archiving of that data file. The process then returns to step 300 as indicated.

Figure 4:
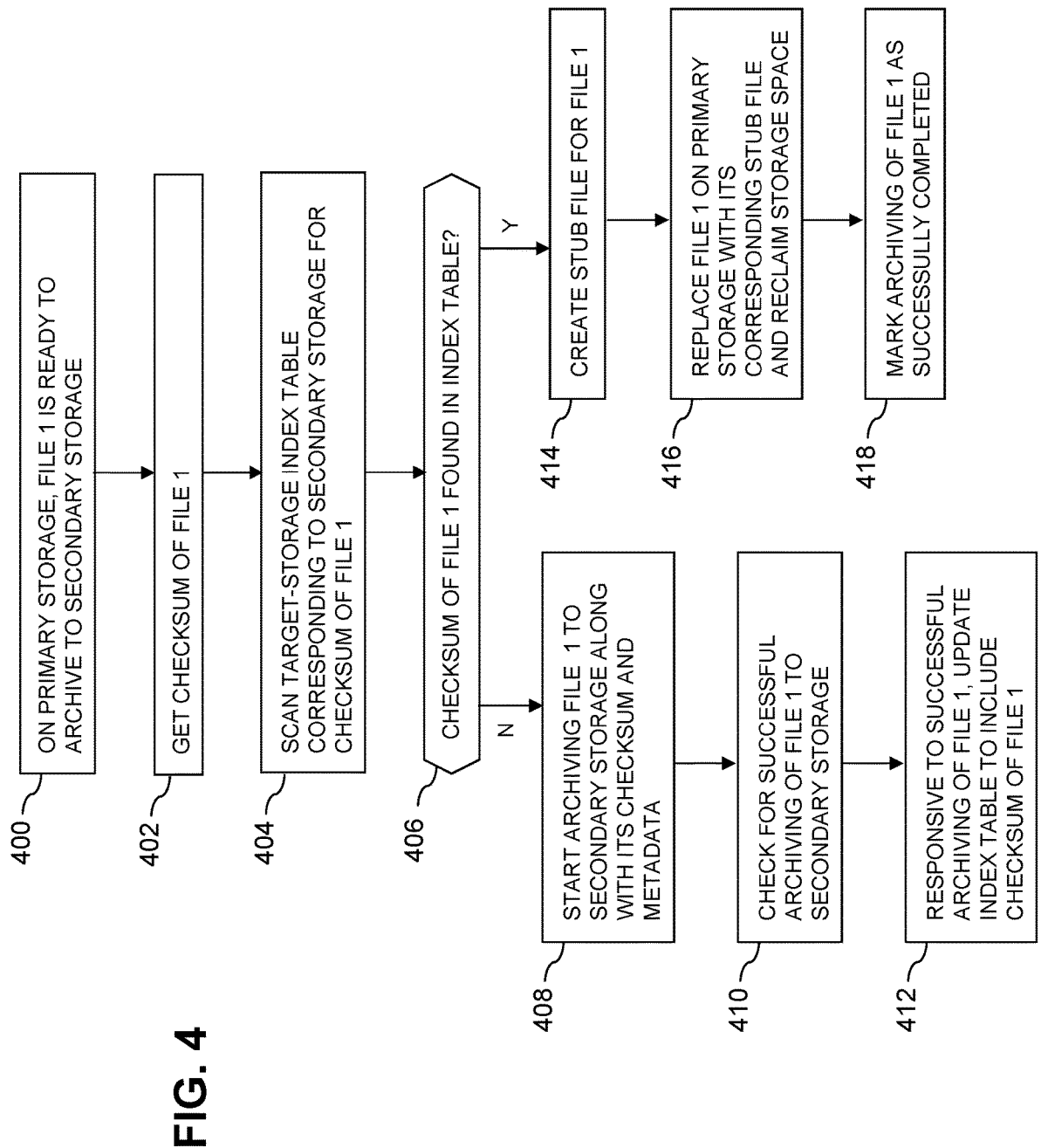
FIGS. 4 and 5 are flow diagrams showing additional examples of respective first and second portions of an efficient table-based archiving process in illustrative embodiments.
Figure 5:
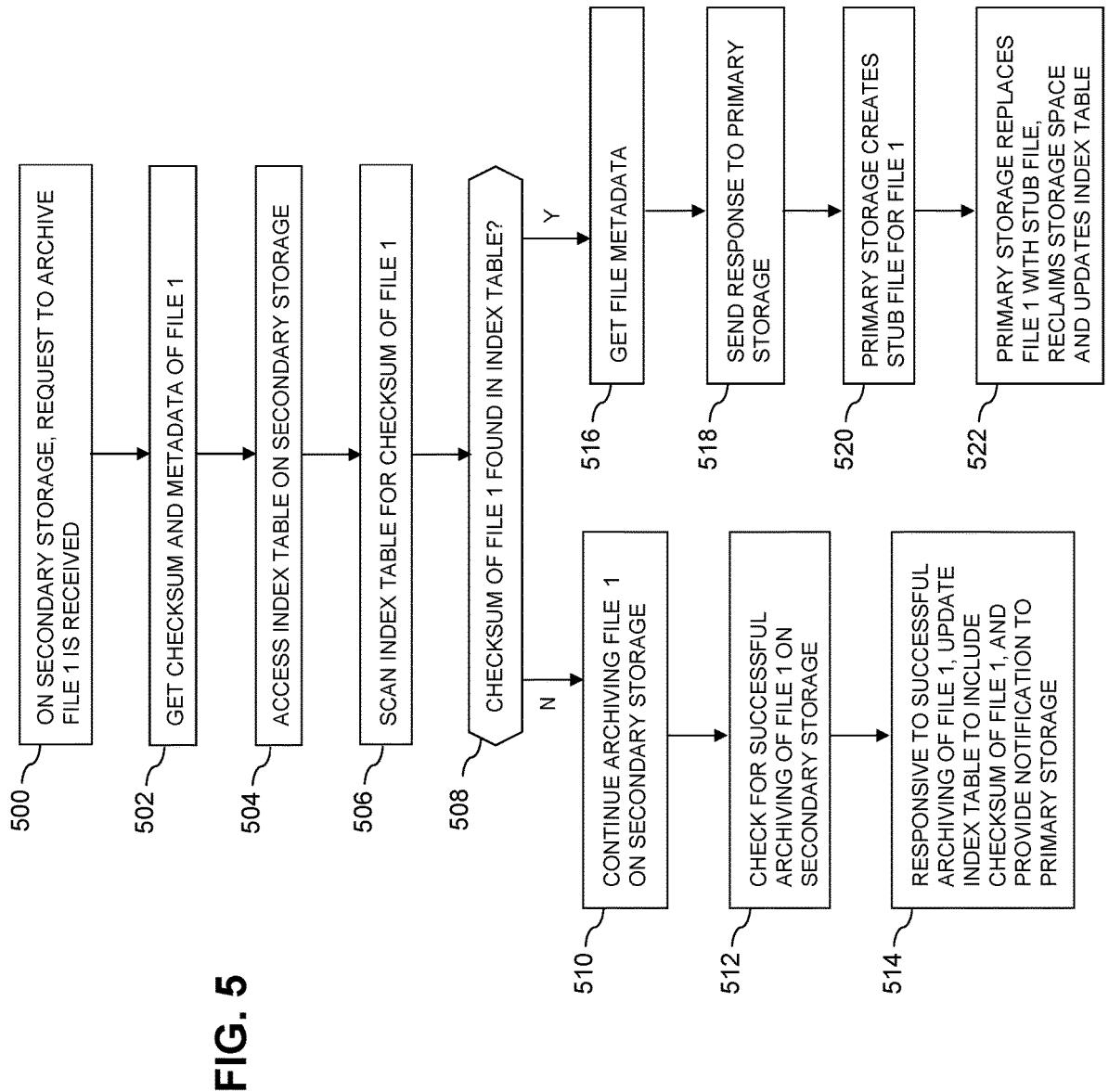

FIGS. 4 and 5 show additional examples of respective first and second portions of an efficient table-based archiving process in illustrative embodiments.

Referring initially to FIG. 4, the first portion of the example process is performed primarily on a source side and includes steps 400 through 418 as shown, with steps 400 through 418 all being performed on the source side. This first portion of the process illustratively starts at step 400 and ends after step 412 or step 418, but multiple iterations of the process can occur for different data files to be archived, as in other embodiments herein.

In step 400, a particular data file, illustratively denoted as File 1, is ready to be archived from a source cluster to a target cluster, also referred to as primary storage and secondary storage, respectively. The source and target clusters may be, for example, the respective source and target storage systems 102S and 102T of the FIG. 1 embodiment.

In step 402, the source cluster obtains the checksum of the particular data file to be archived, that is, File 1.

In step 404, the source cluster accesses an index table maintained for the target cluster on the source cluster. The index table has a plurality of entries containing checksums of respective data files previously archived from the source cluster to the target cluster, and is also referred to in this embodiment as a "target-storage" index table. The source cluster scans the index table for a checksum of the particular data file to be archived, that is, File 1.

In step 406, a determination is made as to whether or not the checksum of File 1 has a corresponding entry in the index table. Responsive to the checksum of File 1 not having a corresponding entry in the index table, the process moves to step 408, and otherwise moves to step 414 as indicated.

In step 408, which is reached if the index table does not have an entry for the checksum of File 1, the source cluster initiates archiving of File 1 to the target cluster utilizing the checksum and metadata for that file.

In step 410, the source cluster checks for a successful completion of the archiving, resulting in a copy of File 1 on the target cluster.

In step 412, the source cluster updates the index table to include an entry for the checksum of archived File 1. Although not explicitly shown, the source cluster illustratively performs additional operations, such as, for example, creating stub file for File 1, replacing File 1 on the source cluster with the stub file and reclaiming the space previously occupied by File 1 on the source cluster, as will be described in more detail below in conjunction with steps 520 and 522 of FIG. 5. The process then ends for the archiving of File 1, but may be repeated for archiving of other files.

In step 414, which is reached if the index table has an entry for the checksum of File 1, the source cluster creates a stub file for File 1. Such a stub file illustratively includes a link and/or other information identifying a location at which File 1 is archived.

In step 416, the source cluster replaces File 1 on the source cluster with the stub file and reclaims the space previously occupied by File 1 on the source cluster. The stub file is illustratively of much smaller size than File 1, and may be stored in a memory of the source cluster or elsewhere in the source cluster, such that the replacement of File 1 with the stub file leads to the freeing up of significant storage resources. It should be noted that terms such as "replace" and "replacement" as used herein are intended to be broadly construed, so as to encompass, for example, arrangements in which a stub file is used to point to an archived file in secondary storage so as to allow deletion of the archived file from primary storage, as well as other arrangements in which the archived file is not necessarily deleted from primary storage.

In step 418, the source cluster marks the archiving of File 1 as having been successfully completed. The process then ends for the archiving of File 1, but may be repeated for archiving of other files.

Referring now to FIG. 5, the second portion of the example process is performed primarily on a target side and includes steps 500 through 522 as shown, with steps 500 through 518 being performed on the target side and steps 520 and 522 being performed on the source side. This second portion of the process illustratively starts at step 500 and ends after step 514 or step 522, but multiple iterations of the process can occur for different data files to be archived, as in other embodiments herein.

In step 500, a target cluster receives a request for archiving of a particular data file, illustratively denoted as File 1, from a source cluster to the target cluster, also referred to as primary storage and secondary storage, respectively. The source and target clusters may be, for example, the respective source and target storage systems 102S and 102T of the FIG. 1 embodiment.

In step 502, the target cluster obtains the checksum of the particular data file to be archived, that is, File 1. Metadata of File 1 is also illustratively obtained by the target cluster in this step of the process.

In step 504, the target cluster accesses an index table maintained for the target cluster on the target cluster. The index table has a plurality of entries containing checksums of respective data files previously archived from one or more source clusters to the target cluster.

In step 506, the target cluster scans the index table for a checksum of the particular data file to be archived, that is, File 1.

In step 508, a determination is made as to whether or not the checksum of File 1 has a corresponding entry in the index table. Responsive to the checksum of File 1 not having a corresponding entry in the index table, the process moves to step 510, and otherwise moves to step 516 as indicated.

In step 510, which is reached if the index table does not have an entry for the checksum of File 1, the target cluster continues the process of archiving File 1 from the source cluster to the target cluster.

In step 512, the target cluster checks for a successful completion of the archiving. The successful completion of the archiving results in a copy of File 1 on the target cluster.

In step 514, responsive to determining that the archiving of File 1 has been successfully completed, the target cluster updates the index table to include an entry for the checksum of archived File 1, and sends a corresponding notification of successful completion of the archiving of File 1 to the source cluster. The process then ends for the archiving of File 1, but may be repeated for archiving of other files.

In step 516, which is reached if the index table has an entry for the checksum of File 1, the target cluster obtains the file metadata, illustratively from an associated header, which may be part of the request.

In step 518, the target cluster responds to the source cluster with a notification that File 1 is archived on the target cluster. The response illustratively includes updated file metadata for the archived file.

In step 520, the source cluster creates a stub file for File 1. As indicated previously, such a stub file illustratively includes a link and/or other information identifying a location at which File 1 is archived.

In step 522, the source cluster replaces File 1 on the source cluster with the stub file and reclaims the space previously occupied by File 1 on the source cluster. The source cluster also updates the source-side index table, maintained by the source cluster for files archived to the target cluster, to include an entry for the checksum of archived File 1. The process then ends for the archiving of File 1, but may be repeated for archiving of other files.

The particular processing operations and other system functionality described in conjunction with the flow diagrams of FIGS. 2 through 5 are presented by way of illustrative example only, and should not be construed as limiting the scope of the disclosure in any way. Alternative embodiments can use other types of processing operations involving host devices, storage systems and functionality for efficient table-based archiving. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different archiving processes for respective different pairs of source and target storage systems within a given information processing system.

Functionality such as that described in conjunction with the flow diagrams of FIGS. 2 through 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for efficient table-based archiving can be performed using different system components.

The particular arrangements described above for efficient table-based archiving are therefore presented by way of illustrative example only. Numerous alternative arrangements of these and other features can be used in implementing efficient table-based archiving in other illustrative embodiments.

As indicated previously, the illustrative embodiments disclosed herein can provide a number of significant advantages relative to conventional arrangements.

For example, some embodiments provide techniques for efficient table-based archiving which can advantageously avoid duplicate archiving of files or other types and arrangements of data that are subject to archiving.

Moreover, illustrative embodiments disclosed herein can significantly reduce the system resources and network bandwidth consumed by a given archiving process, thereby providing substantially more efficient archiving and avoiding adverse performance impacts of conventional approaches.

Some embodiments disclosed herein can advantageously determine upfront for a given file whether or not that file has already been archived from a given source cluster of a current archiving process, or possibly some other source cluster of a different archiving process, to the target cluster, and avoid archiving that same file again from the given source cluster to the target cluster.

Various aspects of functionality associated with efficient table-based archiving as disclosed herein can be implemented in a host device, in a storage system, or partially in a host device and partially in a storage system, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement processing devices with efficient table-based archiving functionality will now be described in greater detail with reference to FIGS. 6 and 7. Although described in the context of system 100, these platforms may also be used to implement at least portions of other information processing systems in other embodiments.

Figure 6:
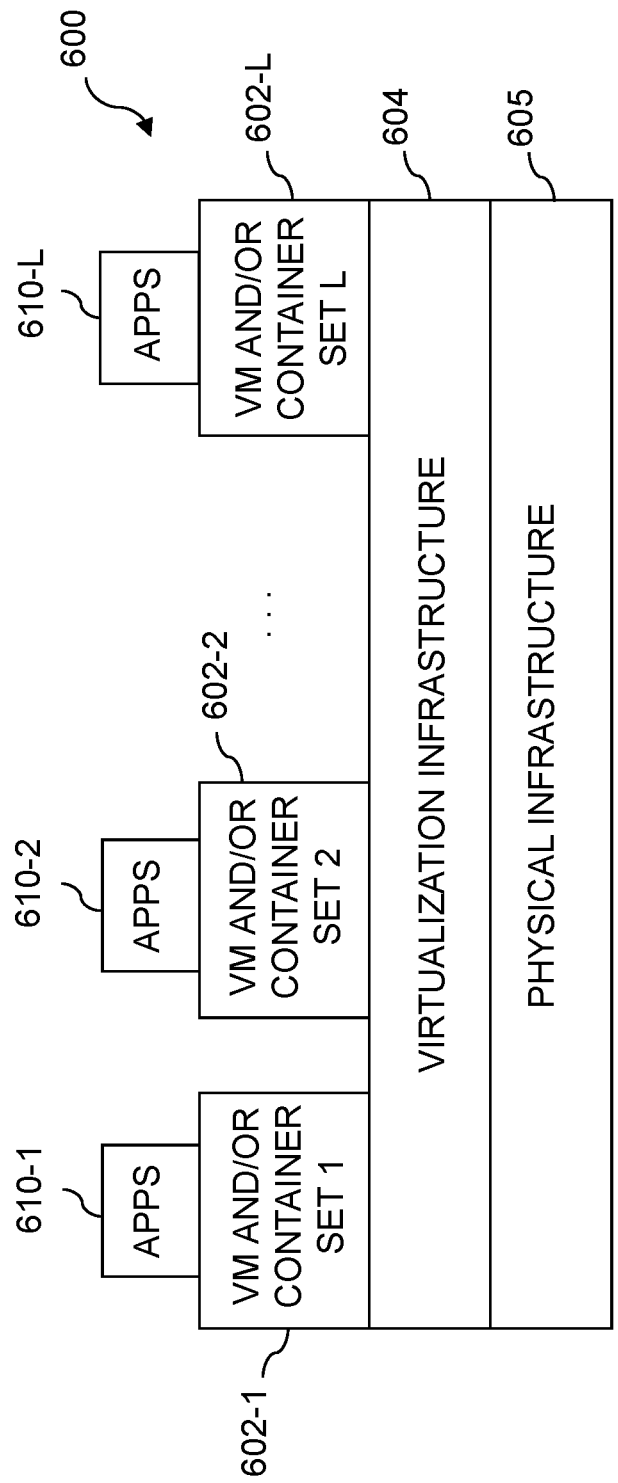
FIGS. 6 and 7 show examples of processing platforms that may be utilized to implement at least a portion of an information processing system in illustrative embodiments.
Figure 7:
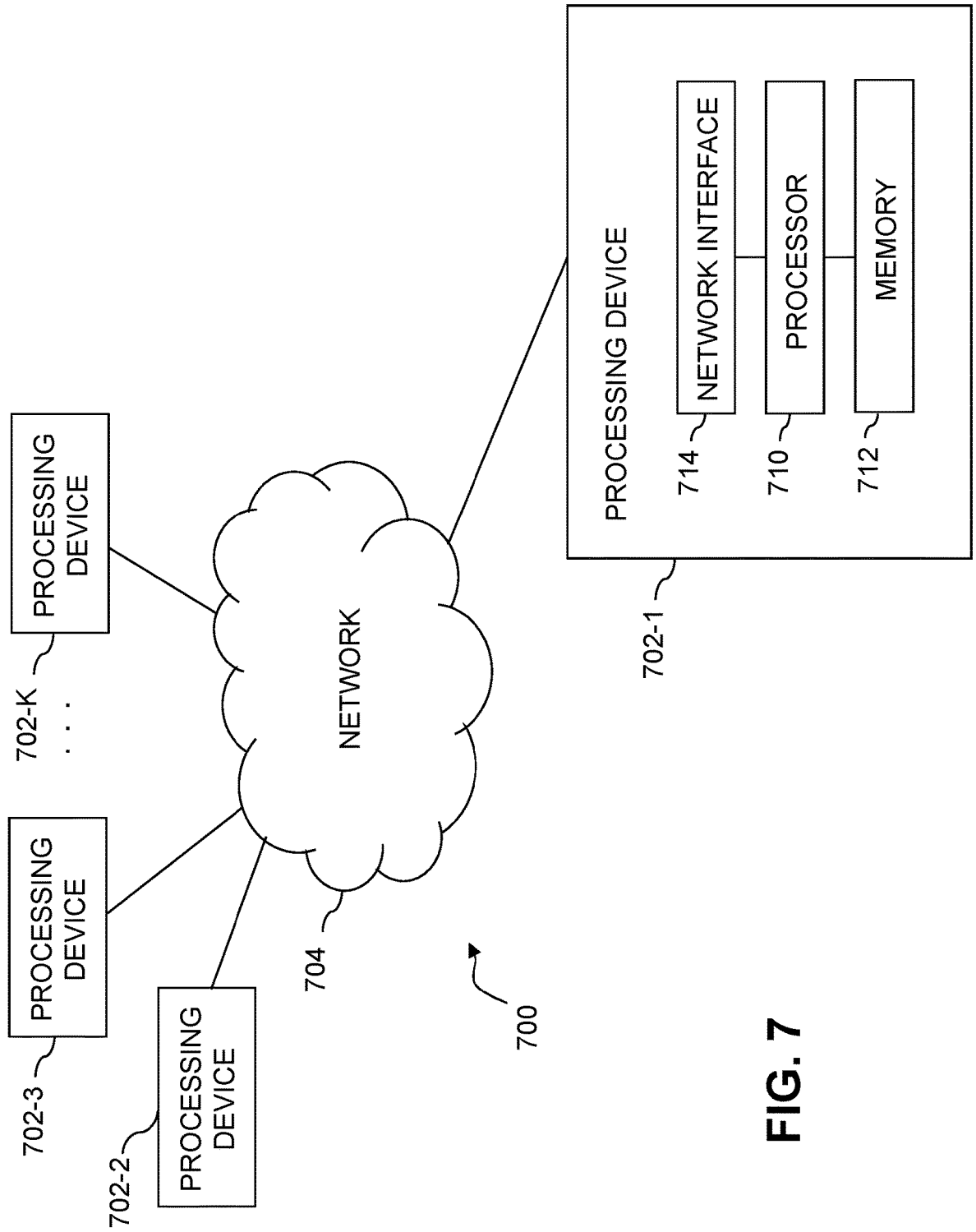

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide at least portions of the disclosed efficient table-based archiving functionality in an information processing system of the type described above using one or more processes running on a given one of the VMs. For example, each of the VMs can implement logic instances and/or other components providing efficient table-based archiving functionality in the system 100.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide at least portions of the disclosed efficient table-based archiving functionality in an information processing system of the type described above. For example, a container host device supporting multiple containers of one or more container sets can implement logic instances and/or other components providing efficient table-based archiving functionality in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the efficient table-based archiving functionality provided by one or more components of an information processing system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, archiving processes, archiving control logic instances, index tables and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to maintain for a first storage system one or more index tables characterizing data archived from the first storage system to at least a second storage system;
   to receive a request to archive a particular data item from the first storage system to the second storage system;
   to access, responsive to the received request, a corresponding one of the one or more index tables characterizing data archived from the first storage system to at least the second storage system; and
   to control archiving of the particular data item based at least in part on one or more entries of the corresponding one of the one or more index tables;
   wherein controlling archiving of the particular data item based on one or more entries of the corresponding one of the one or more index tables comprises initiating in the first storage system archiving of the particular data item from the first storage system to the second storage system responsive to the one or more entries of the corresponding one of the one or more index tables not including an identifier of the particular data item, and updating in the first storage system the one or more entries of the corresponding one of the one or more index tables to include the identifier of the particular data item responsive to receipt of an indication in the first storage system from the second storage system that archiving of the particular data item has successfully completed in the second storage system.

2. The apparatus of claim 1 wherein said at least one processing device comprises at least a portion of a storage controller of the first storage system.

3. The apparatus of claim 1 wherein the first storage system and the second storage system comprise respective storage clusters with each such storage cluster comprising a plurality of storage nodes.

4. The apparatus of claim 1 wherein a given one of the one or more index tables comprises an archived file index table having a plurality of entries comprising respective content-based identifiers of respective files previously archived between the first storage system and the second storage system.

5. The apparatus of claim 4 wherein the content-based identifiers in respective entries of the archived file index table comprise respective checksums generated from content of the respective previously-archived files.

6. The apparatus of claim 4 wherein the content-based identifiers in respective entries of the archived file index table comprise respective hash values generated from content of the respective previously-archived files.

7. The apparatus of claim 1 wherein at least one of the one or more index tables characterizes a plurality of data files previously archived from the first storage system to the second storage system.

8. The apparatus of claim 7 wherein the first storage system comprises a primary storage system and the second storage system comprises a secondary storage system.

9. The apparatus of claim 7 wherein the first storage system comprises a source storage system of a designated archiving process and the second storage system comprises a target storage system of the designated archiving process, wherein in conjunction with completion of a corresponding portion of the designated archiving process for a given data file, the source storage system creates a stub file to replace the given data file, releases storage space occupied by the given data file, and marks archiving of the given data file as complete.

10. The apparatus of claim 1 wherein controlling archiving of the particular data item based at least in part on one or more entries of the corresponding one of the one or more index tables comprises initiating archiving of the particular data item from the first storage system to the second storage system responsive to the particular data item not having a corresponding content-based identifier in a first index table of the first storage system.

11. The apparatus of claim 10 wherein controlling archiving of the particular data item based at least in part on one or more entries of the corresponding one of the one or more index tables further comprises completing archiving of the particular data item from the first storage system to the second storage system responsive to the particular data item not having a corresponding content-based identifier in a second index table of the second storage system.

12. A computer program product comprising a non-transitory processor-readable storage medium having stored therein program code of one or more software programs, wherein the program code, when executed by at least one processing device comprising a processor coupled to a memory, causes the at least one processing device:
   to maintain for a first storage system one or more index tables characterizing data archived from the first storage system to at least a second storage system;
   to receive a request to archive a particular data item from the first storage system to the second storage system;
   to access, responsive to the received request, a corresponding one of the one or more index tables characterizing data archived from the first storage system to at least the second storage system; and to control archiving of the particular data item based at least in part on one or more entries of the corresponding one of the one or more index tables;

wherein controlling archiving of the particular data item based on one or more entries of the corresponding one of the one or more index tables comprises initiating in the first storage system archiving of the particular data item from the first storage system to the second storage system responsive to the one or more entries of the corresponding one of the one or more index tables not including an identifier of the particular data item, and updating in the first storage system the one or more entries of the corresponding one of the one or more index tables to include the identifier of the particular data item responsive to receipt of an indication in the first storage system from the second storage system that archiving of the particular data item has successfully completed in the second storage system.

13. The computer program product of claim 12 wherein a given one of the one or more index tables comprises an archived file index table having a plurality of entries comprising respective content-based identifiers of respective files previously archived between the first storage system and the second storage system, and further wherein the content-based identifiers in respective entries of the archived file index table comprise at least one of respective checksums generated from content of the respective previously-archived files and respective hash values generated from content of the respective previously-archived files.

14. The computer program product of claim 12 wherein at least one of the one or more index tables characterizes a plurality of data files previously archived from the first storage system to the second storage system.

15. The computer program product of claim 14 wherein the first storage system comprises a source storage system of a designated archiving process and the second storage system comprises a target storage system of the designated archiving process, wherein in conjunction with completion of a corresponding portion of the designated archiving process for a given data file, the source storage system creates a stub file to replace the given data file, releases storage space occupied by the given data file, and marks archiving of the given data file as complete.

16. A method comprising:
maintaining for a first storage system one or more index tables characterizing data archived from the first storage system to at least a second storage system;
receiving a request to archive a particular data item from the first storage system to the second storage system;
accessing, responsive to the received request, a corresponding one of the one or more index tables characterizing data archived from the first storage system to at least the second storage system; and
controlling archiving of the particular data item based at least in part on one or more entries of the corresponding one of the one or more index tables;

wherein controlling archiving of the particular data item based on one or more entries of the corresponding one of the one or more index tables comprises initiating in the first storage system archiving of the particular data item from the first storage system to the second storage system responsive to the one or more entries of the corresponding one of the one or more index tables not including an identifier of the particular data item, and updating in the first storage system the one or more entries of the corresponding one of the one or more index tables to include the identifier of the particular data item responsive to receipt of an indication in the first storage system from the second storage system that archiving of the particular data item has successfully completed in the second storage system.

17. The method of claim 16 wherein a given one of the one or more index tables comprises an archived file index table having a plurality of entries comprising respective content-based identifiers of respective files previously archived between the first storage system and the second storage system, and further wherein the content-based identifiers in respective entries of the archived file index table comprise at least one of respective checksums generated from content of the respective previously-archived files and respective hash values generated from content of the respective previously-archived files.

18. The method of claim 16 wherein at least one of the one or more index tables characterizes a plurality of data files previously archived from the first storage system to the second storage system.

19. The method of claim 18 wherein the first storage system comprises a source storage system of a designated archiving process and the second storage system comprises a target storage system of the designated archiving process, wherein in conjunction with completion of a corresponding portion of the designated archiving process for a given data file, the source storage system creates a stub file to replace the given data file, releases storage space occupied by the given data file, and marks archiving of the given data file as complete.

20. The method of claim 16 wherein controlling archiving of the particular data item based at least in part on one or more entries of the corresponding one of the one or more index tables comprises:
initiating archiving of the particular data item from the first storage system to the second storage system responsive to the particular data item not having a corresponding content-based identifier in a first index table of the first storage system; and
completing archiving of the particular data item from the first storage system to the second storage system responsive to the particular data item not having a corresponding content-based identifier in a second index table of the second storage system.

* * * * *